(12) United States Patent
Nagatomo

(10) Patent No.: US 7,460,442 B2
(45) Date of Patent: Dec. 2, 2008

(54) OPTICAL DISK APPARATUS

(75) Inventor: Takashi Nagatomo, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 11/064,268

(22) Filed: Feb. 23, 2005

(65) Prior Publication Data
US 2005/0195697 A1 Sep. 8, 2005

(30) Foreign Application Priority Data
Feb. 24, 2004 (JP) ............................ 2004-047663
Nov. 22, 2004 (JP) ............................ 2004-336822

(51) Int. Cl.
G11B 7/085 (2006.01)
(52) U.S. Cl. .................. 369/30.03; 369/47.4; 369/30.27
(58) Field of Classification Search .............. 369/30.03, 369/47.4, 30.1–30.17, 30.27
See application file for complete search history.

(56) References Cited

U.S. PATENT DOCUMENTS 4,998,238 A * 3/1991 Mizunoe et al. ............. 369/116
5,465,244 A 11/1995 Kobayashi et al.
6,215,740 B1 * 4/2001 Sasaki ....................... 369/44.28
6,385,143 B1 * 5/2002 Sasaki ........................ 369/30.1
6,493,297 B1 * 12/2002 Isono et al. ............... 369/44.37

FOREIGN PATENT DOCUMENTS

| EP | 0 555 065 | 8/1993 |
| EP | 0 714 096 | 5/1996 |
| JP | 61 80563 | 4/1986 |
| JP | 7 44868 | 2/1995 |
| JP | 11 296868 | 10/1999 |
| WO | WO 97 28530 | 8/1997 |

* cited by examiner

Primary Examiner—Marvin M Lateef
Assistant Examiner—Brenda Bernardi
(74) Attorney, Agent, or Firm—Frommer Lawrence & Haug LLP; William S. Frommer

(57) ABSTRACT

An optical disk apparatus for controlling two optical pickups in an optimized way in response to operation modes for rotating the optical disk. When receiving a request for seeking one optical pickup from a HOST, a CPU judges whether to move the other optical pickup synchronously to satisfy positional restriction of the two optical pickups. Furthermore, when operating one optical pickup upon, for example, a read request from the HOST, the CPU judges whether to move the other pickup to follow.

22 Claims, 7 Drawing Sheets

OPTICAL DISK APPARATUS

BACKGROUND

1. Field of the Invention

The present invention relates to an optical disk apparatus for recording and reproducing data on an optical disk such as a Digital Video Disk or Digital Versatile Disk (DVD) by using two optical pickups.

2. Background Discussion

Disk rotation methods (i.e., a spindle rotation controlling method) of an optical disk apparatus for recording and reproducing data on an optical disk such as a DVD, may use a CAV (Constant Angular Velocity) system varying an RF frequency according to a distance from the center of the optical disk such that rotation of the optical disk is constant, and/or a CLV (Constant Linear Velocity) system that varies the rotation of the spindle according to a distance from the center of the optical disk.

In general, the CLV system is capable of transmitting data in successive tracks, while the CAV system is capable of accessing different tracks.

Moreover, an optical disk apparatus may have two optical pickups in order to write data on an optical disk at a high speed.

Such an optical disk apparatus is capable of writing data twice as fast as an optical disk apparatus having a single optical pickup. However, when a distance from the center of the optical disk to the positions of both optical pickups is the same, then the linear velocity of the optical pickups are different, thus not permitting address read operations and data read/write operations to be performed in the CLV system.

Therefore, it is desired to have an optical disk apparatus having two optical pickups to perform an optimized control of each optical pickup in response to an operation mode for rotating an optical disk.

SUMMARY OF THE INVENTION

An embodiment of the present invention is an optical disk apparatus for performing an optimized control of two optical pickups in response to an operation mode for rotating an optical disk.

One embodiment is directed to an optical disk apparatus that may include a first optical pickup and a second optical pickup for reading/writing data on the optical disk.

A motor is used to rotate the optical disk, the motor operating in at least (i) a first region of the optical disk at a first velocity and (ii) a second region of the optical disk at a second velocity.

The apparatus also has an optical disk controlling unit for managing addresses on the optical disk and for controlling the first optical pickup and the second optical pickup so that the optical pickups are positioned at desired addresses on the optical disk.

The optical disk controlling unit judges, in a seek operation moving the first optical pickup to a target address, whether to move the second optical pickup to the target address at the same time with the first optical pickup based on a positional relation of the target address to said first region or a difference between the first and the second regions corresponding to the positions of the first optical pickup and the second optical pickup, respectively.

Another embodiment of the present invention is directed to an optical disk apparatus that includes a first optical pickup and a second optical pickup for reading/writing data on the optical disk.

A motor rotates the optical disk, the motor operating in at least (i) a first region of the optical disk at a first velocity and (ii) a second region of the optical disk at a second velocity.

An optical disk controlling unit manages addresses on the optical disk and controls the first optical pickup and the second optical pickup so that the optical pickups are positioned at desired addresses on the optical disk.

The optical disk rotates at a constant linear velocity, and the optical disk controlling unit, in a seek operation moving the first optical pickup to the target address, moves the second optical pickup to the target address at the same time with the first optical pickup, when a target region, which is a region to which the target address belongs, departs from the region at which the second optical pickup is positioned by more than one region.

Another embodiment of the present invention is directed to an optical disk apparatus that includes a first optical pickup and a second optical pickup for reading/writing data on the optical disk.

A motor rotates the optical disk, the motor operating in at least (i) a first region of the optical disk at a first velocity and (ii) a second region of the optical disk at a second velocity.

An optical disk controlling unit manages addresses on the optical disk and controls the first optical pickup and the second optical pickup so that the optical pickups are positioned at desired addresses on the optical disk.

The optical disk controlling unit judges whether to move the first optical pickup to an address at which the second pickup is positioned, based on a positional relation between the regions in which the first and second optical pickups are positioned and said first region, and a difference of the addresses at which the first and second optical pickups are respectively positioned.

Another embodiment of the present invention is directed to an optical disk apparatus that includes a first optical pickup and a second optical pickup for reading/writing data on the optical disk.

A motor rotates the optical disk, the motor operating in at least (i) a first region of the optical disk at a first velocity and (ii) a second region of the optical disk at a second velocity.

The optical disk controlling unit manages addresses on the optical disk and controls the first optical pickup and the second optical pickup so that the optical pickups are positioned at desired addresses on the optical disk. The optical disk controlling unit moves the first optical pickup to an address at which the second pickup is positioned when a difference between the address at which the first and the second addresses are positioned exceeds a first address length.

BRIEF DESCRIPTION OF THE DRAWINGS

These and other objects and features of the present invention will be described in more detail with reference to the accompanying drawings, in which.

DESCRIPTION OF THE PREFERRED EMBODIMENTS

An embodiment of an optical disk apparatus according to the present invention, will be described with reference to the attached drawings.

Figure 1:
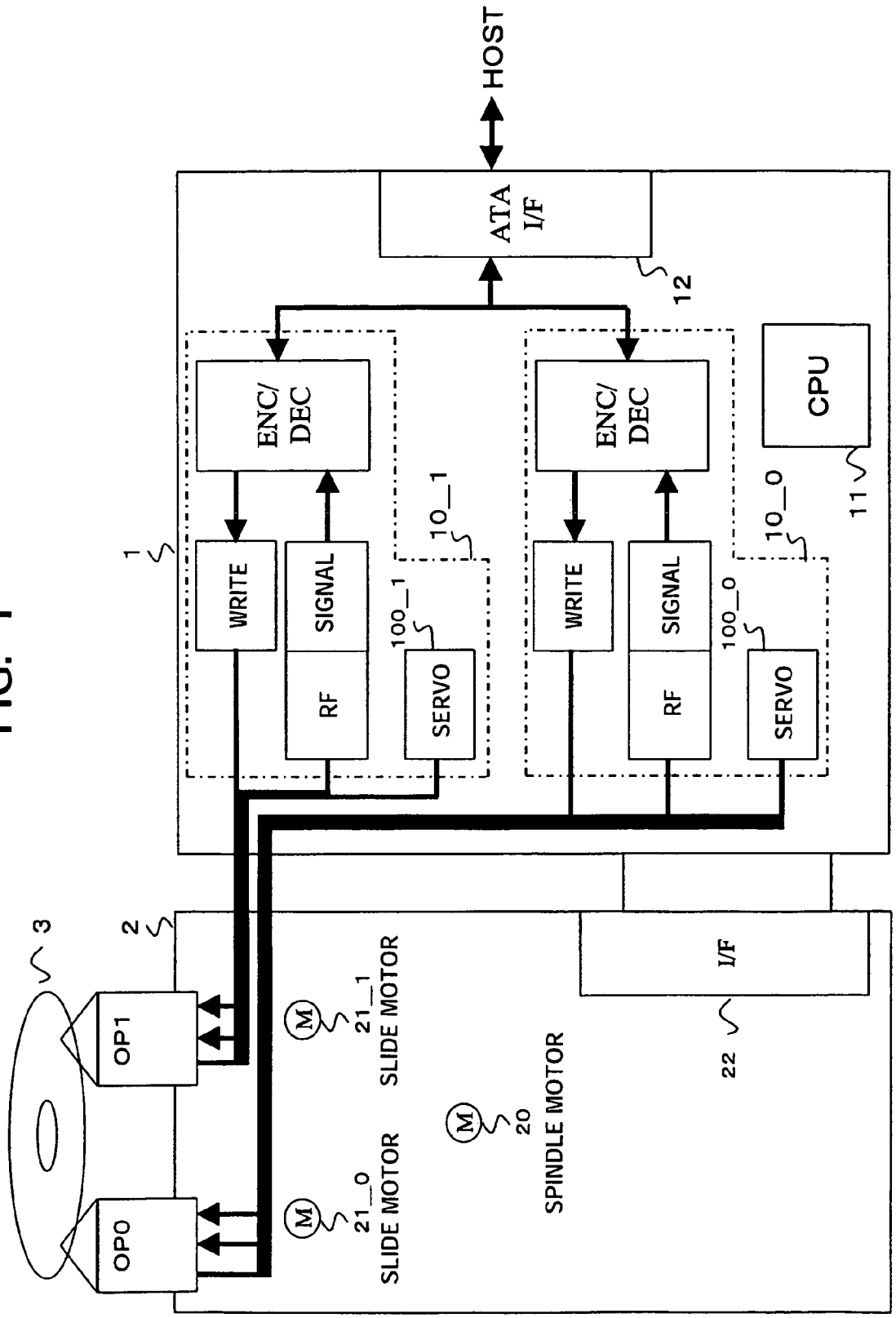
FIG. 1 is a block diagram illustrating an example of a configuration of an optical disk apparatus according to the present invention.

FIG. 1 is a block diagram illustrating an example of a configuration of an optical disk apparatus. As shown in FIG. 1, the optical disk apparatus records/reproduces data on an optical disk 3 by two optical pickups OP0, OP1. It is configured to include an optical disk controlling unit 1 and a driving unit 2.

The optical pickup OP0 is an embodiment of a first optical pickup according to the present invention; the optical pickup OP1 is an embodiment of a second optical pickup according to the present invention; the optical disk controlling unit 1 is an embodiment of an optical pickup controlling unit and a motor controlling unit according to the present invention.

Each element forming the optical disk controlling unit 1 will be explained.

The CPU 11 controls the optical disk controlling unit 1 in response to commands provided from a HOST via the ATA interface 12.

The following commands (requests), for example, are sent out from the HOST.

(1) DRIVE OFF request
Stop a driving operation to the optical disk 3.
(2) SEEK request
Move optical pickup OP0/OP1 to a desired position on the optical disk 3.
(3) READ request
Read data from a desired position on the optical disk 3 and send the same to the HOST.
(4) WRITE request
Write data to a desired position on the optical disk 3.

The CPU 11 manages addresses at which the optical pickups OP0 and OP1 are positioned by a RUB value. The RUB value is a physical data unit into which addresses on the optical disk are divided by a predetermined byte, for example, 64 KB.

The CPU 11 also manages positions of the optical pickups OP0, OP1 on the optical disk by a data area called a Band. The Band is a data area into which addresses are divided in order, from the center of the optical disk by every 2048 RUBs. That is, addresses are managed by software from the center to the outside of the optical disk, for example, Band: 0, Band: 1, Band: 2, . . . , Band:n (where n is any number). In the following description, "Band" may be used as a variable value of a data area or region in which the optical pickups OP0, OP1 are positioned.

Note that each Band corresponds to one of a plurality of data areas or regions according to the present invention; a data amount of a Band, that is, 2048 RUBs corresponds to a first address length.

The CPU 11 controls a spindle motor 29 in the driving unit 2.

The optical disk apparatus according to the present invention is capable of rotating the spindle motor 20 under a CAV mode, a CLV mode, and a LCLV (Limited Constant Linear Velocity) mode.

Figure 2:
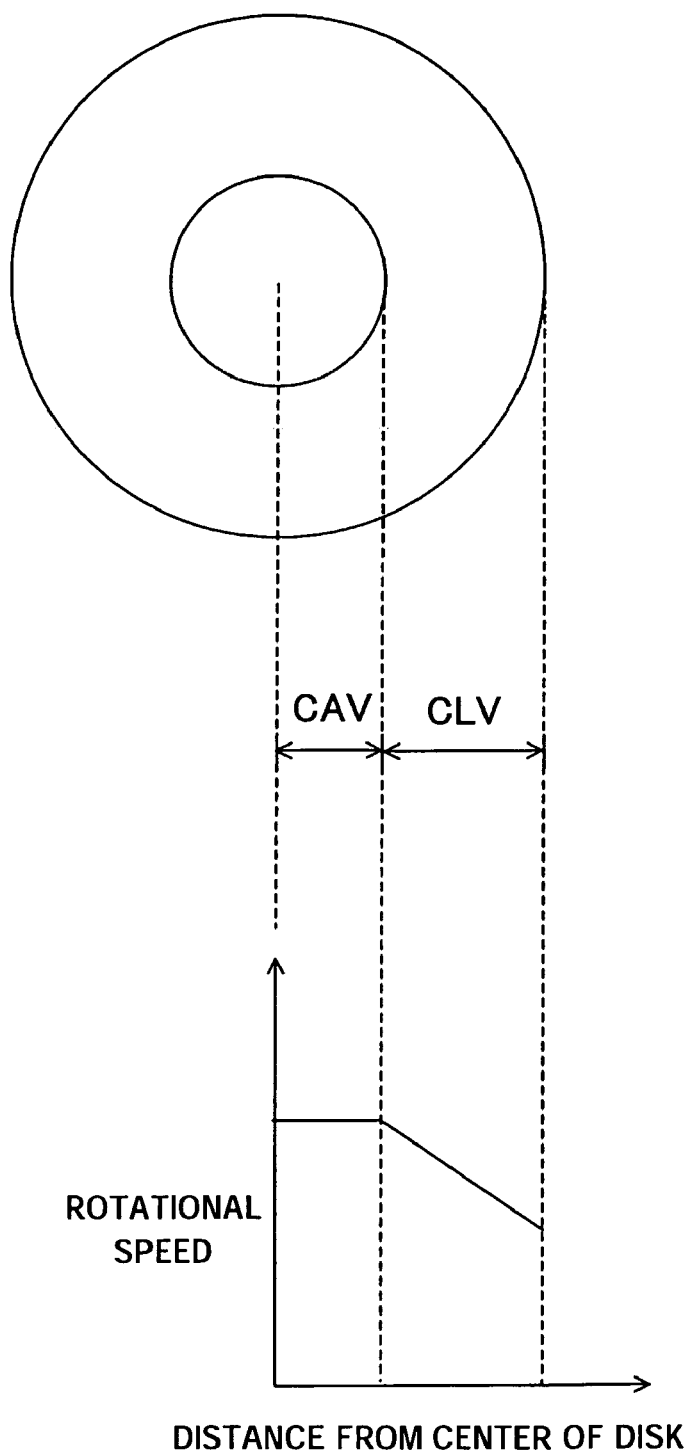
FIG. 2 is a view describing a rotation control in a LCLV mode.

FIG. 2 is a view describing a control method for rotating under the LCLV mode. The CLV mode requires a high rotational speed near the center of the optical disk 3. However, near center of the optical disk, it takes time to reach a condition where the spindle motor 20 is stable at a target rotational speed, that is, a spindle lock condition, which does not satisfy a specification of a seek operation and accordingly does not allow an operation by the CLV mode.

Therefore, as shown in FIG. 2, the optical disk apparatus according to the present invention has the LCLV mode in which it operates by either the CLV mode or the CAV mode in response to the positions of the optical pickups. That is, in the LCLV mode, the optical disk apparatus operates by the CAV mode when both optical pickups OP0 and OP1 are positioned from the center to a predetermined track of the optical disk, and it operates by the CLV mode when the pickups are positioned from the predetermined track to the outside on the optical disk.

In the present embodiment, an example will be explained in which the track where an operation mode (CAV/CLV) varies under the LCLV belongs to Band: 8.

Note that this Band: 8 corresponds to a first data area or first data region of the present invention.

The following table indicates a relation between positions of the optical pickups and operation modes.

TABLE 1

| Optical pickup OP0 | Optical pickup OP1 | Operation mode |
|---|---|---|
| Band: 0 to 7 | Band: 0 to 8 | CAV |
| Band: 0 to 7 | Band: 9 and more | Operation impossible |
| Band: 8 | Band: 0 to 8 | CAV |
| Band: 8 | Band: 9 | CLV |
| Band: 8 | Band: 10 and more | Operation impossible |
| Band: 9 and more | Band: less than (Band_of_OP0 −2) | Operation impossible |
| Band: 9 and more | Band: Band_of_OP0 +/−1 | CLV |
| Band: 9 and more | Band: More than (Band_of_OP0 +2) | Operation impossible |

The optical disk controlling unit 1 has dual signal processing units 10_0, 10_1 reading and writing data on the optical disk 3 via the optical pickups OP0, OP1.

Operations performed in each of the signal processing units are identical, so the signal processing unit 10_0 will only be described below.

The signal processing unit 10_0, in reading out data on the optical disk 3, performs RF processing (pit detection) for a signal photo-electrically converted by the optical pickup OP0, then a variety of signal processing operations (SIGNAL), such as a clock reproduction and decoding processing (DEC) are performed. The read out data is sent to the HOST via the ATA interface (ATA I/F) 12.

The signal processing unit 10_0, in writing data on the optical disk 3, performs encoding (ENC) including an error correction processing to data sent from the HOST via the ATA interface 12, then performs a write processing operation (WRITE), and records the data on the optical disk 3 by controlling the laser power by a laser driver (not shown).

The servo operating unit (SERVO) 100_0 forms a feedback servo control system together with each motor in the driving unit 2. It controls the focus, tracking, and sliding of the optical pickup OP0 against the optical disk 3.

Figure 3:
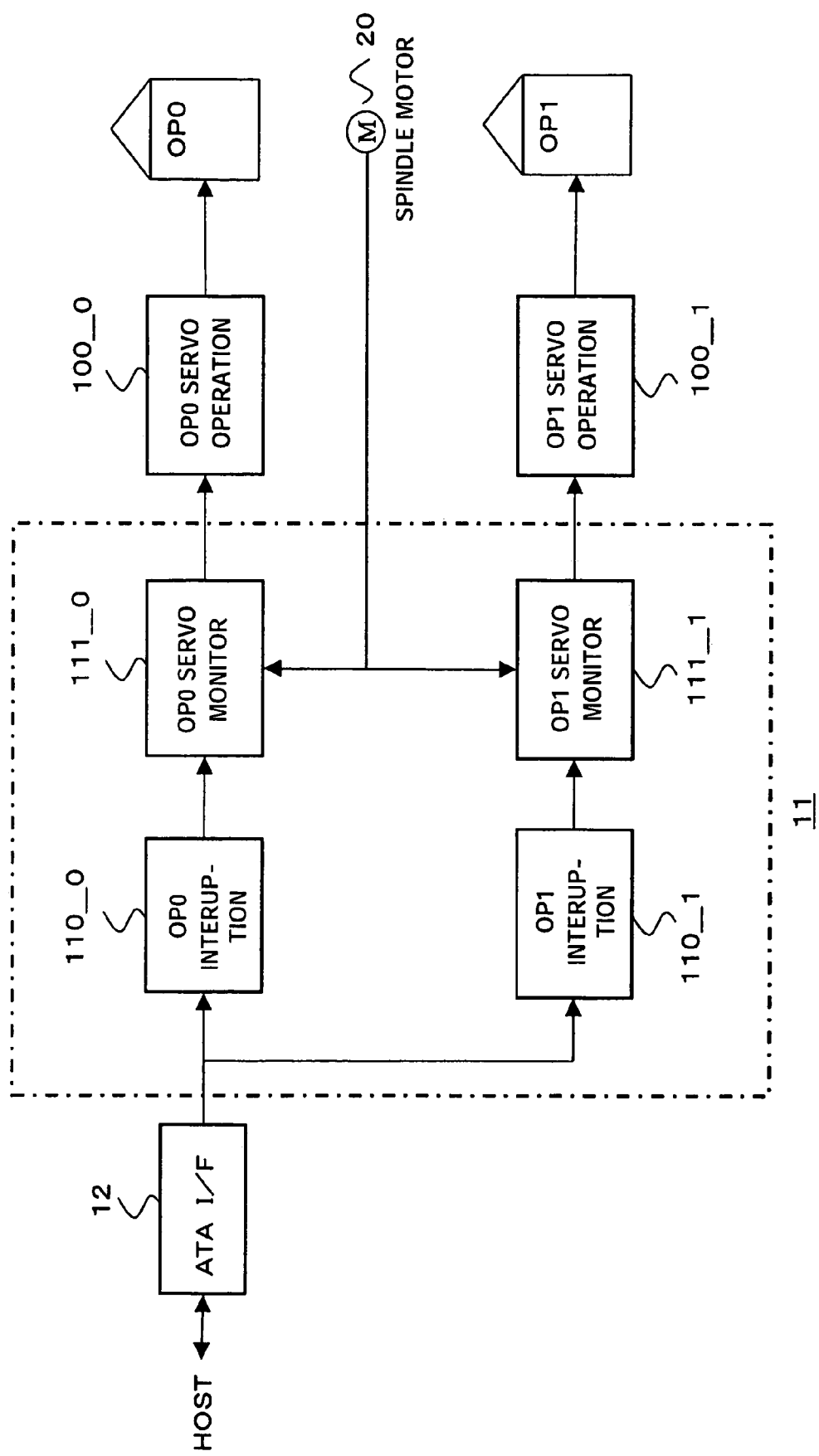
FIG. 3 is a block diagram illustrating signal processing in an optical disk apparatus according to the present invention.

For example, when a SEEK request is sent from the HOST, the CPU 11 orders the servo operating unit 100_0 so that it moves an optical pickup upon the request to a designated position. Then, the servo operating unit 100_0 controls the slide motor 21_0 in the driving unit 2. As a result, the optical pickup moves to the designated position upon the request. FIG. 3 is a block diagram illustrating a signal processing performed by the CPU 11.

As shown in FIG. 3, the CPU 11 has interruption operating units 110_0, 110_1 and servo monitoring units 111_0 and 111_1.

The interruption operating units 110_0, 110_1 perform interruption periodically to check whether any SEEK requests from the HOST are present.

The interruption operating units 110_0 and 110_1, in response to a request (command) from the HOST, change their status to any of the following:

(1) IDLE status;
(2) Drive On status (in which servo is active);
(3) Drive Off status (in which servo is not active);
(4) Seek status;
(5) Read status; and
(6) Write status.

The interruption operating units 110_0 and 110_1 perform a later described synchronous seek operation when a seek request is present from the HOST. They perform a later-described follow seek operation voluntarily when a seek request is not present from the HOST (IDLE status).

The servo monitoring units 111_0 and 111_1 monitor the servo operating unit 100_0 and 100_1, respectively.

For example, when the interruption operating unit 110_0 decides to perform a seek operation to the optical pickup OP0, such that it moves to a target address, the servo monitoring unit 111_0 monitors the servo operating unit 100_0 to see if the seek operation is properly performed to the target address.

Next, positional restriction of the optical pickups will be described to be considered when the interruption operating units 110_0 and 110_1 perform seek operations.

Positional Restriction of the Optical Pickups

As described above, the optical disk apparatus according to the present invention operates under each operation mode of CAV, CLV, and LCLV. It controls the seek operation to the optical pickups OP0, OP1 in an optimized way. In performing the seek operation, the optical disk apparatus controls the seek operation in consideration with the following positional restrictions of the optical pickups OP0, OP1.

(1) CAV Mode

As described above, the CAV mode is a mode varying an RF frequency according to a distance from a center of an optical disk such that rotation of the optical disk is constant. In the CAV mode, there may not be positional restriction of the optical pickups OP0, OP1.

(2) CLV Mode

As described above, the CLV mode is a mode varying rotation of a spindle according to a distance from a center of an optical disk. In the CLV mode, address read operations and data read/write operations cannot be performed unless distances from the center of the optical disk to the position of the two optical pickups are at the same level.

Therefore, there is typically a difference of the Bands in which the optical pickup OP0 and the optical pickup OP1 are positioned for example, a difference of one or less (one region or less, or one data area or less).

(3) LCLV Mode

In the LCLV mode, it is desirable to keep a positional relation between the optical pickup OP0 and the optical pickup OP1 to avoid "Operation impossible" in the above table 1.

For example, when both optical pickups OP0 and OP1 are from the central side (Band: 0) to a predetermined Band (Band: 8 in the present embodiment), the optical disk apparatus operates by the CAV mode. Therefore, there is no positional restriction of the optical pickups OP0, OP1.

When both optical pickups OP0 and OP1 are in a Band (Band: 9 or more in the present embodiment) exceeding the predetermined Band (Band: 8 in the present embodiment), the optical disk apparatus operates as the CLV mode. Therefore, it is desirable to keep a difference of the Bands of the optical pickups to one or less (one region or less, or one data area or less).

Moreover, in the case in which one of the two optical pickups is moved or in which data on the optical disk is read out by one of the optical pickups, a control typically follows the other optical pickup.

Therefore, the optical disk apparatus according the present invention has a synchronous seek operation and a follow seek operation, which will be described below.

Synchronous Seek Operation

First, a synchronous seek operation will be described.

The synchronous seek operation is an operation, when SEEK/READ/WRITE commands accompanying a seek operation are sent for only one of the optical pickups, moving the other optical pickup synchronized with the one optical pickup in consideration with the above restriction. Due to this synchronous seek, a condition is maintained in which an address read is possible.

Figure 4:
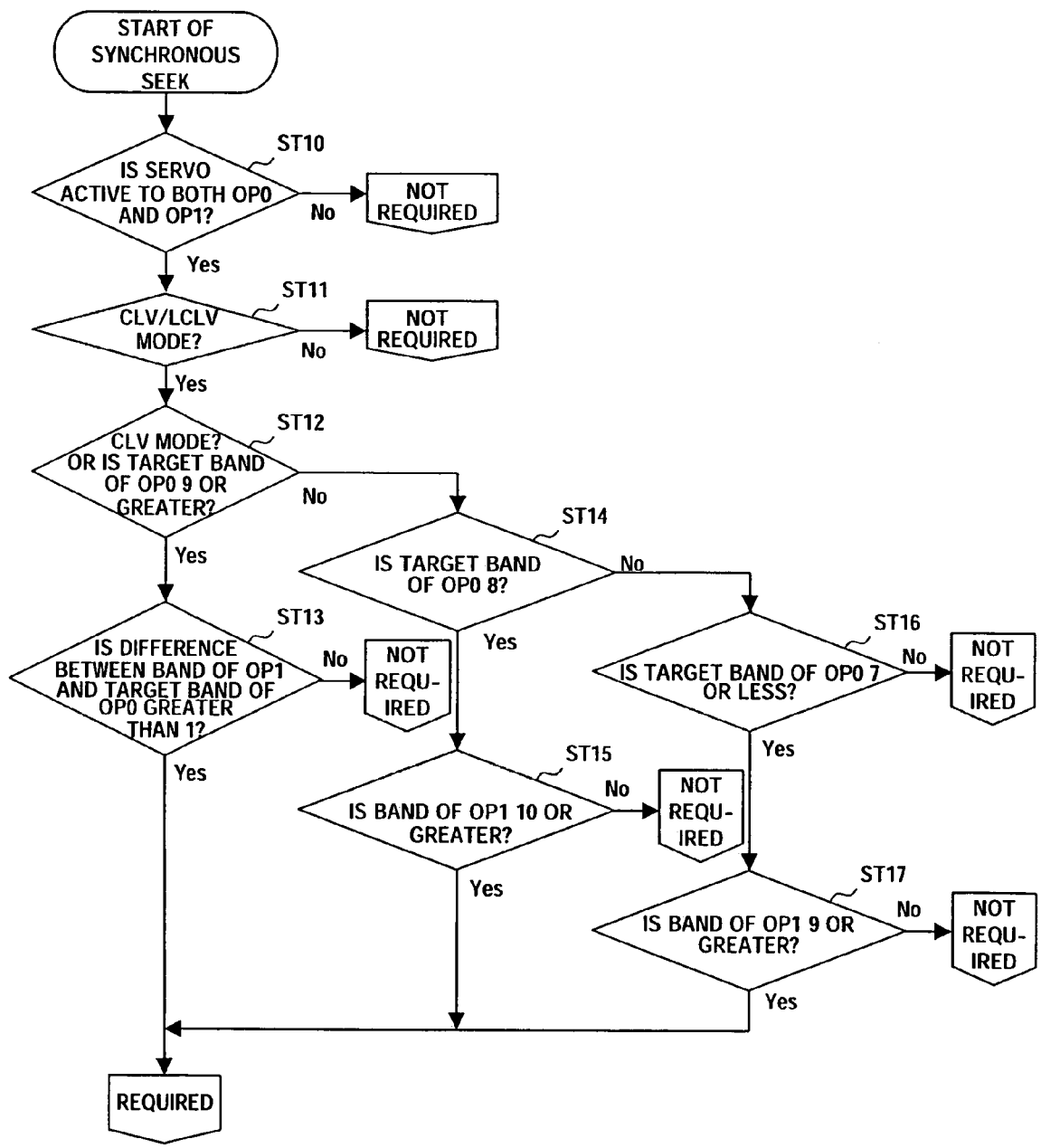
FIG. 4 is a flowchart showing an example of a synchronous seek operation.
Figure 5:
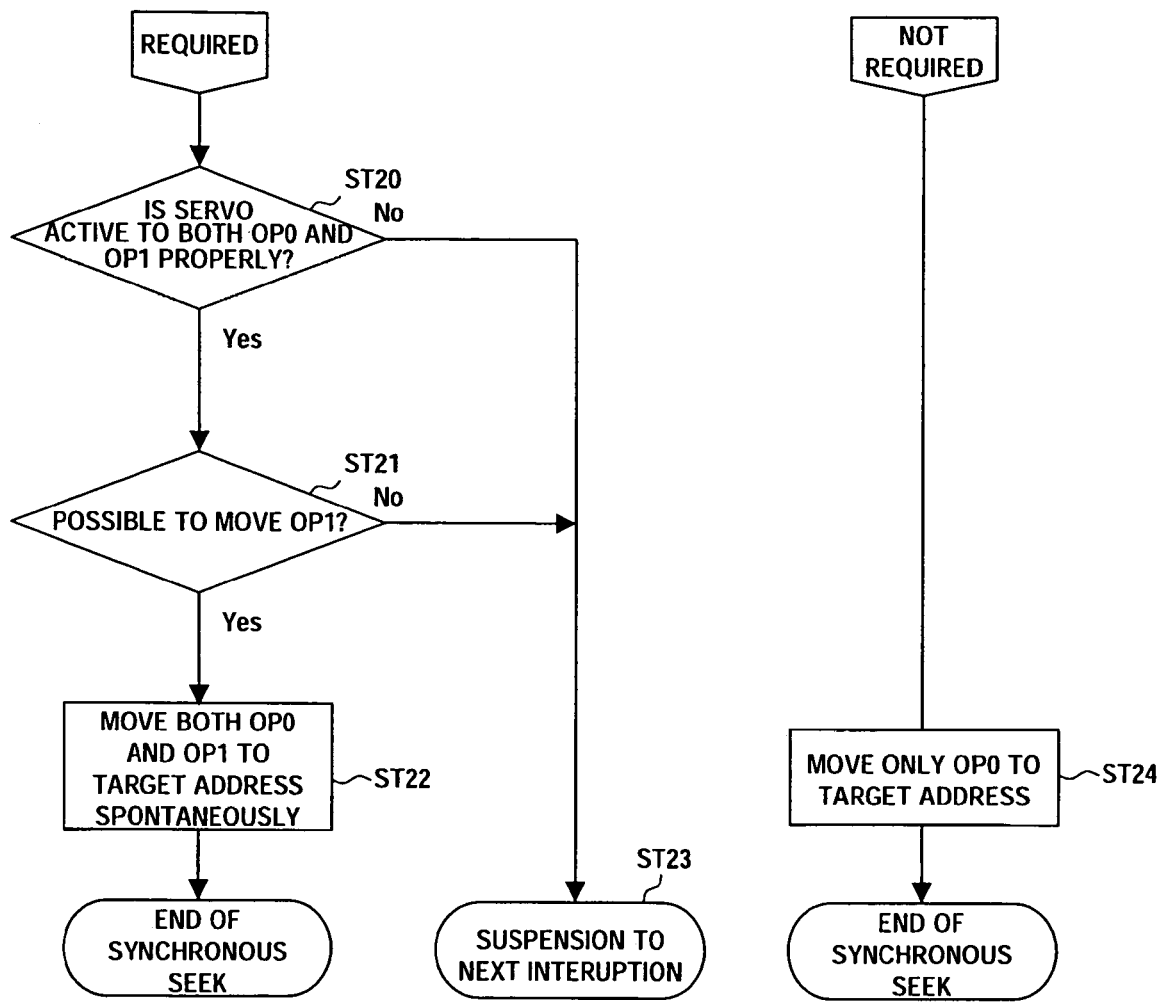
FIG. 5 is a flowchart showing a second example of a synchronous seek operation.

The flowcharts shown in FIG. 4 and FIG. 5 indicate an example of a synchronous seek operation. Below, the synchronous seek operation will be described with reference to FIG. 4 and FIG. 5.

Note, it is assumed in the flowcharts shown in FIG. 4 and FIG. 5 that a SEEK request is made for the optical pickup OP0. Further, in FIG. 4, "Required" means that it is required to perform the synchronous seek operation, while "Not required" means that it is not required to perform the synchronous seek operation.

In FIG. 4, prerequisites for performing the synchronous seek operation are: servo is active to both optical pickups OP1 and OP1 (Step ST10); and the spindle motor 20 is operated in the CLV mode (Step ST11). As is applied only for a read operation, the CAV mode does not require the synchronous seek operation.

Below, in FIG. 4, the case will be described in which the synchronous seek operation is required, that is, the synchronous move for both optical pickups OP0 and OP1 is required.

First, if the spindle motor 20 is operated in the CLV mode (Step ST12); and, a difference between the Band in which the optical pickup OP1 is positioned and a target Band of the optical pickup OP1, that is, the target Band to which a target address upon a SEEK request belongs exceeds one, then the synchronous seek operation is required such that a difference of the Bands of both pickups is one or less (one region or less, or one data area or less).

In the LCLV mode, when the target Band of the optical pickup OP0 is nine or more, the synchronous seek operation is also required because the spindle motor 20 is operated in the CLV mode.

In the LCLV mode, if the target Band of the optical pickup OP0 is eight (Step ST14); and the Band in which the optical pickup OP1 is positioned is ten or more (Step ST15), then the synchronous seek operation is required after the seek operation to the optical pickup OP0 such that a difference of the Bands of both pickups is one or less (one region or less, or one data area or less).

In the LCLV mode, if the target Band of the optical pickup OP0 is seven or less (Step ST16); and the Band in which the optical pickup OP1 is positioned is nine or more (Step ST17), then the synchronous seek operation is required after the seek operation to the optical pickup OP0 such that a difference of the Bands of the pickups is one or less (one region or less, or one data area or less).

FIG. 5 is a flowchart showing operations in a respective case in which the synchronous seek operation is implemented or is not implemented according to the operations shown in FIG. 4.

In the case in which the synchronous seek operation is judged to be desired, if the servo is active for both optical pickups OP0 and OP1 (Step ST20); and the optical pickup OP1 is on the status in which a seek operation is possible (Step ST21), then the optical pickups OP0, OP1 are moved simultaneously (synchronously or at the same time) to the target address upon the SEEK request to the optical pickup OP0 (Step ST22).

Even in the case in which the synchronous seek operation is judged to be required, if the servo is not active for both optical pickups OP0 and OP1 (Step ST20); or the optical pickup OP1 is not on the status in which a seek operation is possible (Step ST21), then the seek operation is not performed and it is suspended until the time the next interruption is set for (Step ST23).

In the case in which the synchronous seek operation is judged not to be desired, only optical pickup OP0 is moved upon the SEEK request (Step ST24) because it is not required to move the optical pickup OP1.

Follow Seek Operation

Next, a follow seek operation will be described.

The follow seek operation is an operation for moving an optical pickup on IDLE status in which commands are not issued. More specifically, in the follow seek operation, when read/write operations are performed for only one of the optical pickups, which makes one optical pickup move gradually on the optical disk, the other optical pickup moves to follow the first optical pickup. Due to this follow seek, a condition is maintained in which an address read is possible.

Figure 6:
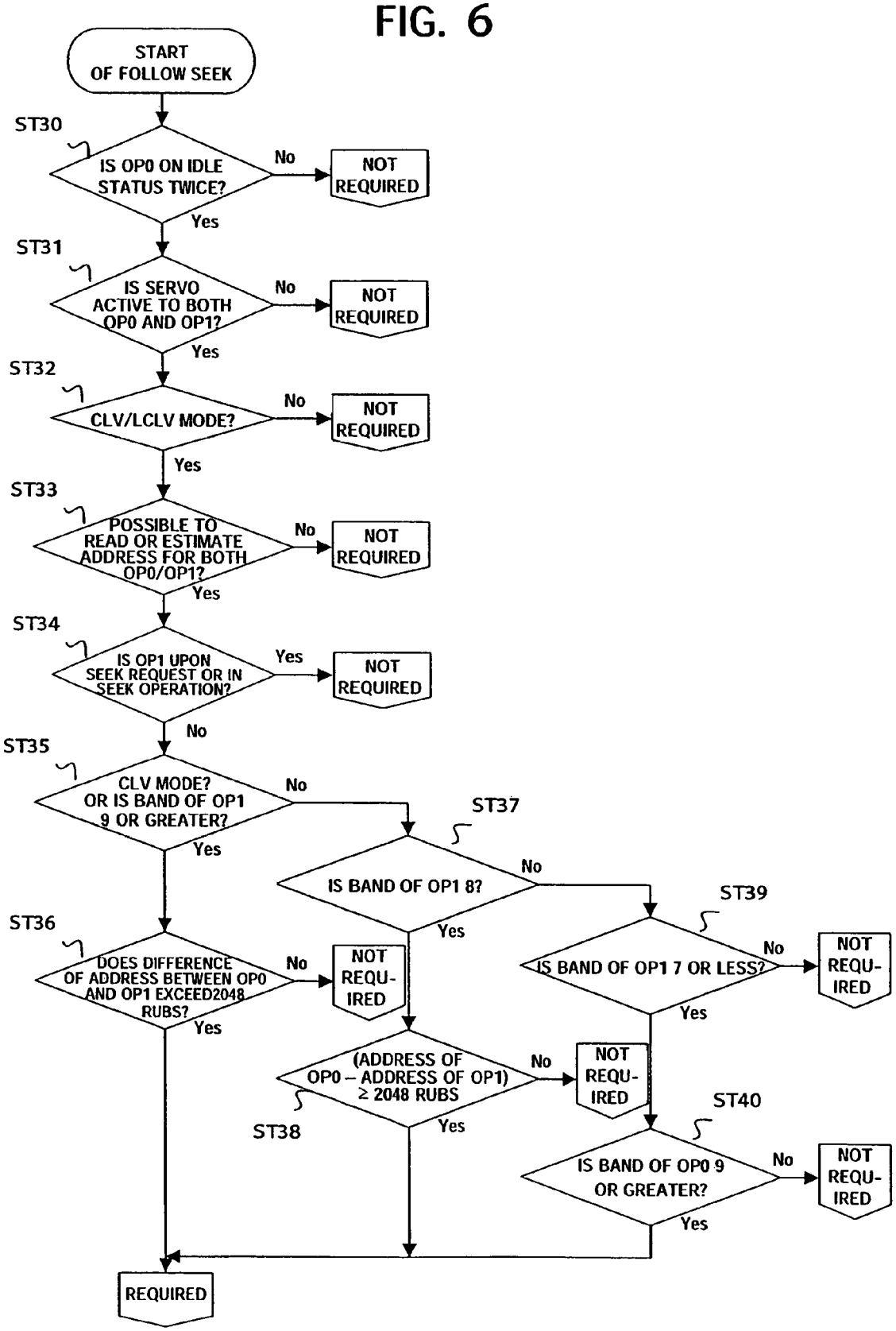
FIG. 6 is a flowchart showing an example of a follow seek operation.
Figure 7:
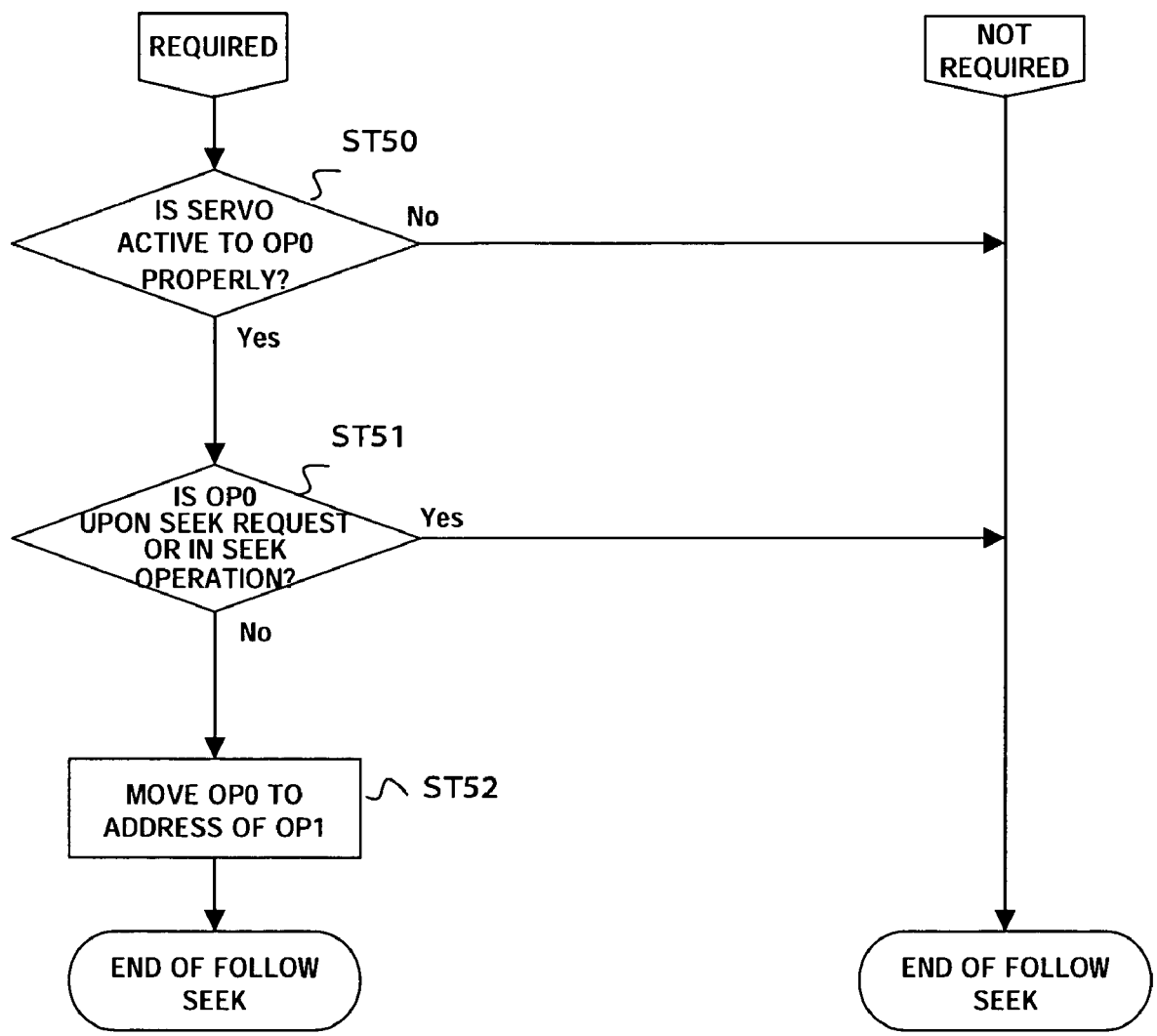
FIG. 7 is a flowchart showing a second example of a follow seek operation.

FIG. 6 and FIG. 7 are flowcharts for describing the follow seek operation. Below, the follow seek operation will be explained with reference to FIG. 6 and FIG. 7.

Note, it is assumed in the flowcharts shown in FIG. 6 and FIG. 7 that the optical pickup to be operated for read, etc. is the optical pickup OP1 for example. Further, in FIG. 6, "Required" means that it is required to perform the follow seek operation, while "Not required" means that it is not required to perform the follow seek operation.

As shown in FIG. 6, prerequisites for performing the follow seek operation are: the optical pickup OP0 is on IDLE status (Step ST30); the servo is active for both optical pickups OP1 and OP1 (Step ST31); the spindle motor 20 is operated in the CLV mode or LCLV mode (Step ST32); it is possible to read the addresses of optical pickups OP0, OP1 or estimate them by interpolation with three samplings or less (Step ST33); and a SEEK request is not made or a seek operation is not performed for the optical pickup OP1 (Step ST34).

Namely, when a request for a synchronous seek is made to the optical pickup OP1, the request is processed with priority.

Below, the case will be described in which the follow seek operation is required, that is, it is required to move the optical pickup OP0 so as to follow the optical pickup OP1.

First, if the spindle motor 20 is operated in the CLV mode (Step ST35); and, a difference of addresses at which the optical pickups OP0 and OP1 are positioned exceeds 2048 RUBs (equivalent data amount of one Band) (Step ST36), then the follow seek operation is required to satisfy the positional restriction of both optical pickups.

In the LCLV mode, if the Band of the address at which the optical pickup OP1 is positioned is nine or more (Step ST35), then the follow seek operation is also required because the spindle motor 20 is operated under CLV mode.

In the LCLV mode, if the Band of the address at which the optical pickup OP1 is positioned is eight (Step ST37); and the address of the optical pickup OP0 is greater than that of the optical pickup OP1 by 2048 RUBs (equivalent data amount of one Band) or more, that is, the optical pickup OP0 is positioned more to the outside than the optical pickup OP1 by one Band data amount (or region amount) or more, then the follow seek operation is required to satisfy the positional restriction of both optical pickups.

When read/write operations are performed successively for one of the optical pickups in the follow seek operation, it typically travels more gradually. Consequently, there is a case in which a difference of the Band of the optical pickups exceeds one during the read/write operations. Therefore, the follow seek operation is performed when the optical pickups depart by the equivalent address of one Band. As a result, it becomes possible to ensure that a difference of the Band of the optical pickups is kept within +/−1.

On the other hand, in the described synchronous seek operation in which both optical pickups are moved simultaneously (synchronously or at the same time), it is possible to start performing the operation with more relaxed conditions compared to the follow seek operation, for example, a difference of the Bands of the pickups should be within +/−1, and a difference of the addresses does not need to be within an equivalent address length of one Band.

In the LCLV mode, if Band of the address (RUB) at which the optical pickup OP1 is positioned is seven or less (Step ST39); and Band of the address (RUB) at which the optical pickup OP0 is positioned is nine or more (Step ST40), then the follow seek operation is required to satisfy the positional restriction of the optical pickups, in other words, a difference of the Bands of the optical pickups should be one or less(one region or less, or one data area or less).

FIG. 7 is a flowchart showing operations in a respective case in which the follow seek operation is required or is not required according to the operations shown in FIG. 6. In the case in which the follow seek operation is judged to be required, if the servo is active for both optical pickups OP0 and OP1 (Step ST50); and a SEEK request is not made or a seek operation is not performed for the optical pickup OP0 (Step ST51), the optical pickup OP0 is moved to the address at which the optical pickup OP1 is positioned to follow the optical pickup OP1. The reason why only the optical pickup OP0 is checked in steps ST50 and ST51 is because the optical pickup OP0 is the only intended optical pickup for the seek operation.

On the other hand, in the case in which the follow seek operation is judged not to be required, the follow seek operation is not performed. If the servo is not active for both optical pickups OP0 and OP1 (Step ST50); or a seek operation, etc. is performed for the optical pickup OP0 (Step ST51), the follow seek operation is also not performed.

As explained above, the optical disk apparatus according to the present embodiment, which has two optical pickups, performs a seek operation in accordance with the positional restriction of both optical pickups based on the respective operation modes, CAV, CLV, and LCLV.

Namely, in the synchronous seek operation, the optical disk apparatus judges, when a SEEK request is made for one of the optical pickups, whether to move the other optical pickup synchronously or at the same time to satisfy the positional restriction of both optical pickups. In the follow seek operation, the optical disk apparatus judges, when moving one of the optical pickups, whether to move the other optical pickup to follow.

Therefore, it becomes possible to write data on an optical disk at a high speed by the two optical pickups and to always keep them on a status in which an address read is possible.

The above embodiment is not to limit the present invention, and one of ordinary skill in the art may change or modify without departing from the spirit or scope of the present invention.

For example, the above embodiment has been described as an example case in which Band is allocated in order from the center of the optical disk, which does not limit the scope of the present invention. As the present invention is to control the optical pickups based on the relative positional relation of the optical pickups, it can be carried out if the positions of the two optical pickups on an optical disk and corresponding data areas on software are associated.

Furthermore, in the above embodiment, the synchronous/follow seek operations are performed so that a difference of the Bands of the optical pickups is kept within +/−1, which does not limit the scope of the present invention. It is apparent to set a threshold variable on software based on a positional relation of the optical pickups that can read addresses.

The optical disk apparatus according to the present embodiment controls two optical pickups in an optimized way and enable a high speed write operation. Therefore, incorporating with an image capturing apparatus, it is preferable for a use in which a vast amount of image data is written into an optical disk at a high speed.

What is claimed is:

1. An optical disk apparatus comprising:
   a first optical pickup and a second optical pickup for reading/writing data on the optical disk;
   a motor for rotating the optical disk, said motor operating in at least (i) a first region of the optical disk at a first velocity and (ii) a second region of the optical disk at a second velocity; and
   an optical disk controlling unit for managing addresses on the optical disk and for controlling the first optical pickup and the second optical pickup so that the optical pickups are positioned at desired addresses on the optical disk;
   wherein the optical disk controlling unit judges, in a seek operation moving the first optical pickup to a target address, whether to move the second optical pickup to the target address at the same time with the first optical pickup based on a positional relation of the target address to said first region or a difference between the first and the second regions corresponding to the positions of the first optical pickup and the second optical pickup, respectively.

2. The optical disk apparatus as set forth in claim 1, wherein the optical disk controlling unit, in a seek operation moving the first optical pickup to the target address, moves the second optical pickup to the target address at the same time with the first optical pickup, when:
   a target region, which is the region to which the target address belongs, is outside of said first region; and
   the target region departs from the second region at which the second optical pickup is positioned by one or more regions.

3. The optical disk apparatus as set forth in claim 1, wherein the optical disk controlling unit, in a seek operation moving the first optical pickup to the target address, moves the second optical pickup to the target address at the same time with the first optical pickup, when:
   a target region, which is the region to which the target address belongs, is identical to said first region; and
   the region at which the second optical pickup is positioned departs outside from the region at which the first optical pickup is positioned by more than one region.

4. The optical disk apparatus as set forth in claim 1, wherein the optical disk controlling unit, in a seek operation moving the first optical pickup to the target address, moves the second optical pickup to the target address at the same time with the first optical pickup, when:
   the target region, which is the region to which the target address belongs, is inside of said first region; and
   the region at which the second optical pickup is positioned moves from the region at which the first optical pickup is positioned.

5. The optical disk apparatus as set forth in claim 1, wherein the optical disk controlling unit, when the rotation of the optical disk is constant, moves the first optical pickup to the target address irrespective of a region at which the second optical pickup is positioned.

6. The optical disk apparatus as set forth in claim 1, wherein the optical disk rotates at a constant linear velocity, and
   wherein the optical disk controlling unit, in a seek operation moving the first optical pickup to the target address, moves the second optical pickup to the target address at the same time with the first optical pickup, when a target region, which is a region to which the target address belongs, moves from the region at which the second optical pickup is positioned by more than one region.

7. The optical disk apparatus as set forth in claim 1, wherein the optical disk controlling unit judges whether to move the first optical pickup to an address at which the second pickup is positioned, based on a positional relation between the regions in which the first and second optical pickups are positioned and said first region, and a difference of the addresses at which the first and second optical pickups are respectively positioned.

8. The optical disk apparatus as set forth in claim 7, wherein the optical disk controlling unit moves the first optical pickup to the address at which the second pickup is positioned when:
   the address at which the second optical pickup is positioned is outside of said first region; and
   a difference of the address at which the first and the second optical pickups are positioned exceeds a first address length.

9. The optical disk apparatus as set forth in claim 7, wherein the optical disk controlling unit moves the first optical pickup to the address at which the second pickup is positioned when:
   the region in which the second optical pickup is positioned is identical to said first region; and
   the address at which the first optical pickup is positioned is greater than that of the second optical pickup by a first address length or more.

10. The optical disk apparatus as set forth in claim 7, wherein the optical disk controlling unit moves the first optical pickup to the address at which the second pickup is positioned when:
    the address at which the second optical pickup is positioned is inside of said first region; and
    the data area at which the first optical pickup is positioned is outside of said first region.

11. The optical disk apparatus as set forth in claim 1, wherein the optical disk controlling unit moves the first optical pickup to an address at which the second pickup is positioned when a difference between the address at which the first and the second addresses are positioned exceeds a first address length.

12. A data recording method for recording data on an optical disk, said method comprising the steps of:
providing a first optical pickup and a second optical pickup for reading/writing data on the optical disk;
providing a motor for rotating the optical disk, said motor operating in at least (i) a first region of the optical disk at a first velocity and (ii) a second region of the optical disk at a second velocity;
managing addresses on the optical disk by utilizing an optical disk controlling unit; and
controlling the first optical pickup and the second optical pickup so that the optical pickups are positioned at desired addresses on the optical disk by utilizing the optical disk controlling unit;
wherein the optical disk controlling unit judges, in a seek operation moving the first optical pickup to a target address, whether to move the second optical pickup to the target address at the same time with the first optical pickup based on a positional relation of the target address to said first region or a difference between the first and the second regions corresponding to the positions of the first optical pickup and the second optical pickup, respectively.

13. The method as set forth in claim 12, wherein the optical disk controlling unit, in a seek operation moving the first optical pickup to the target address, moves the second optical pickup to the target address at the same time with the first optical pickup, when:
a target region, which is the region to which the target address belongs, is outside of said first region; and
the target region moves from the second region at which the second optical pickup is positioned by one or more regions.

14. The method as set forth in claim 12, wherein the optical disk controlling unit, in a seek operation moving the first optical pickup to the target address, moves the second optical pickup to the target address at the same time with the first optical pickup, when:
a target region, which is the region to which the target address belongs, is identical to said first region; and
the region at which the second optical pickup is positioned moves outside from the region at which the first optical pickup is positioned by more than one region.

15. The method as set forth in claim 12, wherein the optical disk controlling unit, in a seek operation moving the first optical pickup to the target address, moves the second optical pickup to the target address at the same time with the first optical pickup, when:
the target region, which is the region to which the target address belongs, is inside of said first region; and
the region at which the second optical pickup is positioned moves outside from the region at which the first optical pickup is positioned.

16. The method as set forth in claim 12, wherein the optical disk controlling unit, when the rotation of the optical disk is constant, moves the first optical pickup to the target address irrespective of a region at which the second optical pickup is positioned.

17. The method as set forth in claim 12, wherein the optical disk rotates at a constant linear velocity, and
wherein the optical disk controlling unit, in a seek operation moving the first optical pickup to the target address, moves the second optical pickup to the target address at the same time with the first optical pickup, when a target region, which is a region to which the target address belongs, departs from the region at which the second optical pickup is positioned by more than one region.

18. The method as set forth in claim 12, wherein the optical disk controlling unit judges whether to move the first optical pickup to an address at which the second pickup is positioned, based on a positional relation between the regions in which the first and second optical pickups are positioned and said first region, and a difference of the addresses at which the first and second optical pickups are respectively positioned.

19. The method as set forth in claim 18, wherein the optical disk controlling unit moves the first optical pickup to the address at which the second pickup is positioned when:
the address at which the second optical pickup is positioned is outside of said first region; and
a difference of the address at which the first and the second optical pickups are positioned exceeds a first address length.

20. The method as set forth in claim 18, wherein the optical disk controlling unit moves the first optical pickup to the address at which the second pickup is positioned when:
the region in which the second optical pickup is positioned is identical to said first region; and
the address at which the first optical pickup is positioned is greater than that of the second optical pickup by a first address length or more.

21. The method as set forth in claim 18, wherein the optical disk controlling unit moves the first optical pickup to the address at which the second pickup is positioned when:
the address at which the second optical pickup is positioned is inside of said first region; and
the data area at which the first optical pickup is positioned is outside of said first region.

22. The method as set forth in claim 12,
wherein the optical disk controlling unit moves the first optical pickup to an address at which the second pickup is positioned when a difference between the address at which the first and the second addresses are positioned exceeds a first address length.

* * * * *